United States Patent [19]

Kurtz

[11] 4,059,906
[45] Nov. 29, 1977

[54] TIE LOCATING DEVICE

[76] Inventor: George W. Kurtz, 611 Suhill Drive, Huntsville, Ala. 35802

[21] Appl. No.: 740,424

[22] Filed: Nov. 10, 1976

[51] Int. Cl.² .............................................. G01B 3/08
[52] U.S. Cl. ................................................. 33/180 R
[58] Field of Search ............ 33/180 R, 143 M, 143 J, 33/161, 174 G, 158

[56] References Cited

U.S. PATENT DOCUMENTS

| 3,148,450 | 9/1964 | Del Pesco | 33/3 B |
| 3,747,220 | 7/1973 | Weisnicht | 33/180 R |

Primary Examiner—Richard E. Aegerter
Assistant Examiner—Willis Little
Attorney, Agent, or Firm—C. A. Phillips

[57] ABSTRACT

A tie locating device having a notched groove at one end for referencing the narrow end of the tie, and a sliding scale extending from the other end of the device having thereon a series of references, which, when the slide is extended, provide a plurality of selected reference marks from which one would be selected and used to align the wide end of the tie, thereby determining the length position of the tie ends for correct tying.

4 Claims, 3 Drawing Figures

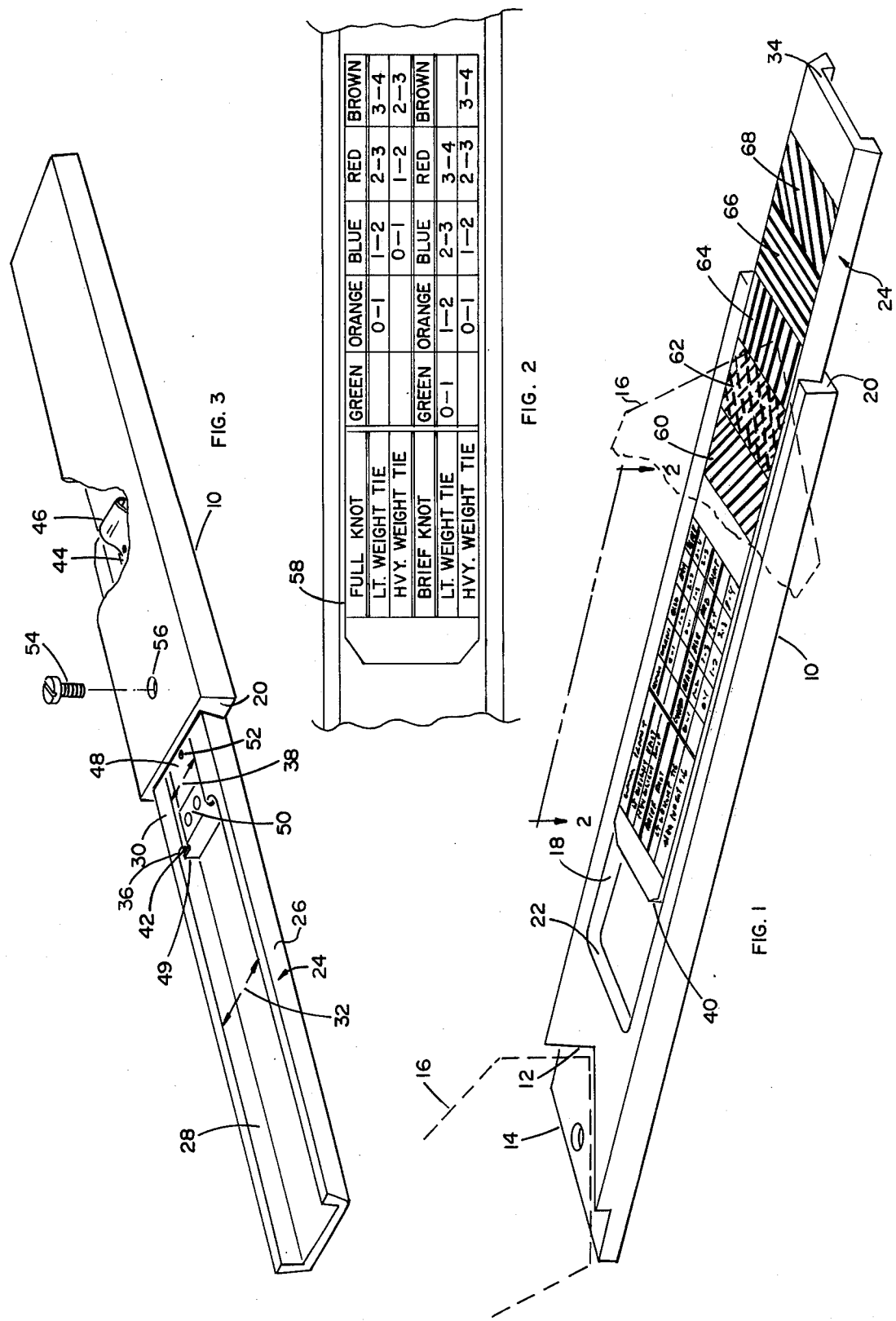

TIE LOCATING DEVICE

BACKGROUND OF THE INVENTION

1. Field of the Invention

This invention relates to a device for adjusting the end positions of a necktie before tying.

2. General Description of the Prior Art

For many, if not most, tying a tie around one's neck so that the ends of the tie will hang at desired heights is most difficult. While several devices have been described in the patent art to assist one in this, the applicant is unaware of any which have proven sufficiently practical to be generally marketable.

It is the object of this invention to provide an improved necktie tying aid which is simple, easy to use, and will insure that the user can consistently tie a tie which will have its wide and front ends hanging at a desired level.

SUMMARY OF THE INVENTION

In accordance with this invention, a device is constructed of two elongated members, a first one being slidable with respect to the second to extend the device longitudinally. The first member has at one end an index for receiving the narrow end of a tie after the tie is placed about the neck of the user. The second member has an extendable position which is adjustably set at the outset by the user, and there appears on the front of the second member a longitudinally spaced series of reference areas from which the user can choose one and place the wide end of the tie opposite it and thereby identify and reference the correct position of the wide end. Thereafter, the adjustment having been made, one can then repeatedly tie the tie in the same hanging position.

BRIEF DESCRIPTION OF THE DRAWINGS

FIG. 1 is a pictorial view generally showing the top and one side of an embodiment of this invention.

FIG. 2 is a top view of a portion of the device shown in FIG. 1 illustrating the instructions for use which appear on the device.

FIG. 3 is a pictorial view of the bottom of the device generally showing a locking and spring biasing mechanism employed in the device.

DETAILED DESCRIPTION OF THE DRAWINGS

Base member 10, of a length of approximately 12½ inches, has a centered notch 12 at a first end 14 for receiving and referencing to it the narrow end of a tie 16, which we will assume is around the neck of a wearer, and narrow end 16 is at an approximate hanging length. A tapered and locking slot 18 extends from end 20 of base member 10 to a point 22 near notch 12. This notch is typically ¼ inch in depth. The width of base member 10 is approximately 2 inches.

Sliding member 24, of a length of approximately 12 inches, has an outer tapered contour 26 adapted to mate with slot 18 of base member 10. It includes a slot 28 in a back surface 30 extending inward from the back surface and of a relatively wide width 32 which extends from end 34 to an intermediate position 36, being approximately 58% of the overall length of sliding member 24. From position 36, an end of relatively wide slot 28, a narrow width slot 38 extends for all or substantially all of the balance of the length of sliding member 24 to its opposite end 40. At the transition between relatively wide slot 28 and relatively narrow slot 38 are shoulder regions 42. Spring 44, positioned in narrow slot 38, has an extending spring arm 46 which rises above the bottom surface of slot 38 and is adapted to provide a frictional drag between the sliding and base members to prevent accidental relative movement between these members. Thus, the tying aid would be held in a minimum length position for more convenient storage, and held in the extended position for usage. Adjustable locking plate 48 has an elongated body and turned-up and outwardly extending arms 49 on end 50. A series of holes 52, spaced approximately ¾ inch apart, are selectively engagable by a bolt 54 through a hole 56 in base member 10. In this manner, arms 49 provide an adjustable stop against shoulders 42 for maximum withdrawal of sliding member 24 and determines a selected operable overall length of the device when in a "use" mode. Thus, by virtue of the three threaded openings in locking plate 48, the user may readily adjust and then fixably set the extendability, and this setting will remain peculiar to his requirements as will be further explained.

Instructions 58 are placed on an upper end region of sliding member 24 and refer to regions 60, 62, 64, 66, and 68, coded, respectively, green, orange, blue, red, and brown. Thus, in order to tie a full Winsor knot with a two- to three-inch overhang, necktie 16 would be placed around the neck of the user, the narrow end positioned in notch 12, and the tie adjusted until the wide end extends downward to red region 66. To effect desired adjustability, the distance between the center point of notch 12 and beginning of the first index region 60 is in the approximate range of 9¾ to 11¼ inches. Upon initially tying a tie in accordance with this instruction, and with locking plate 48 positioned at a mid region, using the mid threaded hole 52, the correctness of the tie is noted. In the event that the tie is short of this dimension, bolt 54 is removed and plate 48 moved to increase the extended length of the device, inserting bolt 54 in the next locking hole position which accomplishes this. If the length is too long, plate 48 is repositioned oppositely to shorten the extended length of the device. After this initial adjustment, the user should not have any further need to adjust locking plate 48, and thereafter may generally follow instructions 58 to achieve a selected overhang of the wide end of a tie with respect to the narrow end.

Having thus disclosed my invention, what is claimed is:

1. A necktie tying aid comprising:

first and second elongated members, said members being slidably attached and relatively movable along a longitudinal path;

a reference notch adjacent to one end of said first member for receiving and referencing the narrow width end of a tie when positioned around the neck of the user;

adjustable stop means for interacting between said first and second members for setting said aid to a selected overall length; and index means by which the length of the wide end of the tie is referenceable, and comprising a plurality of adjacent, individually coded, reference areas extending longitudinally along said second member;

whereby, for a selected overall extended length of said aid, a tie would be tied by first placing it around one's neck at an approximate hanging position, placing the narrow end at said reference notch on said first member, extending said second member to a preset stop position, adjusting the tie position until the wide end of the tie is positioned on a selected reference mark on said second member, and tying a tie knot between the hanging lengths of the tie.

2. A necktie tying aid as set forth in claim 1 wherein the distance between said reference notch and the first of said indidivually coded reference areas is approximately 9¾ to 11¼ inches.

3. A necktie tying aid as set forth in claim 2 wherein said adjustable stop means includes means for enabling said members to be adjustably set between said selected maximum length and a selected shorter length.

4. A necktie tying aid as set forth in claim 3 wherein said first and second members are movable from a position defined by said selected overall length and a shorter length, and said aid further comprises means for frictionally relating said members for preventing free relative movement between said members, whereby said aid may be adjusted to a reduced overall dimension for storage and non-use and extended to said selected overall length for usage, and will remain in one of such positions until moved by the active application of force between said members.

* * * * *